United States Patent [19]

Mayer et al.

[11] Patent Number: 4,758,716
[45] Date of Patent: Jul. 19, 1988

[54] APPARATUS FOR EVALUATING INDICIA ON A MOVING CARRIER

[75] Inventors: Dieter Mayer, Augsburg; Ludwig Zerle, Mering, both of Fed. Rep. of Germany

[73] Assignee: Erhardt +Leimer GmbH, Augsburg, Fed. Rep. of Germany

[21] Appl. No.: 835,609

[22] Filed: Mar. 3, 1986

[30] Foreign Application Priority Data

Mar. 4, 1985 [DE] Fed. Rep. of Germany ....... 3507569

[51] Int. Cl.[4] .............................................. G06K 7/10
[52] U.S. Cl. .................................... 235/470; 235/454; 235/468; 235/491
[58] Field of Search ............... 235/468, 469, 470, 471, 235/491, 454

[56] References Cited

U.S. PATENT DOCUMENTS

| 3,246,126 | 4/1966 | Schlieben et al. | 235/468 X |
| 3,412,245 | 11/1968 | Halverson | 235/468 X |
| 3,483,388 | 12/1969 | Ogle et al. | 235/491 X |
| 3,582,623 | 6/1971 | Rothery et al. | 235/468 X |
| 4,582,986 | 4/1986 | Stockburger et al. | 235/454 |

FOREIGN PATENT DOCUMENTS 3342038 3/1985 Fed. Rep. of Germany .

Primary Examiner—David L. Trafton
Attorney, Agent, or Firm—Herbert Dubno

[57] ABSTRACT

An apparatus for recognizing identifications elements provided on moving carriers includes a reader having a reading head and an evaluating or analyzing logic. The carrier which is advanced past the reading head is provided with at least one identification field including a pattern of marks which are made of phosphorescent substance. By being exposed to light emitted from a light source, the identification marks phosphoresce and are read by the reading head after the exposure has taken place.

13 Claims, 2 Drawing Sheets

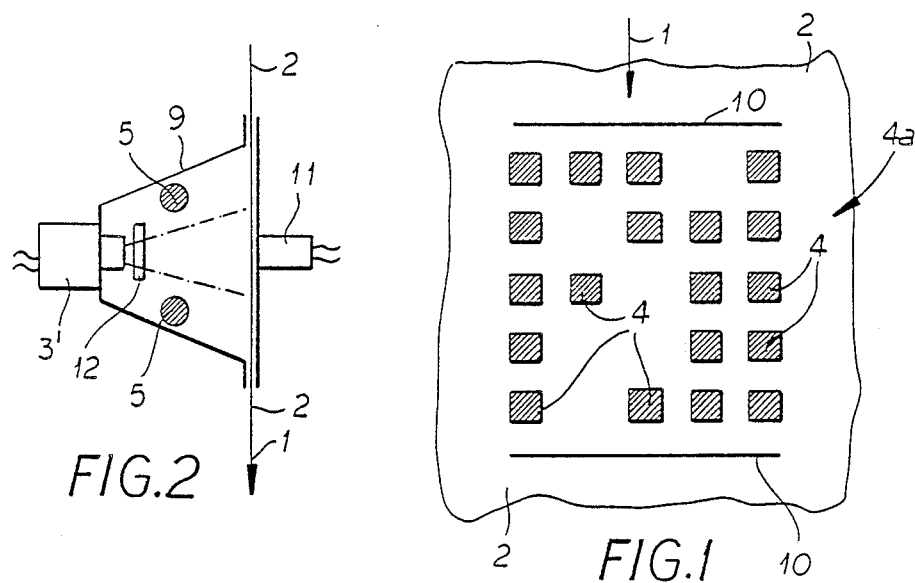
FIG.2
FIG.1
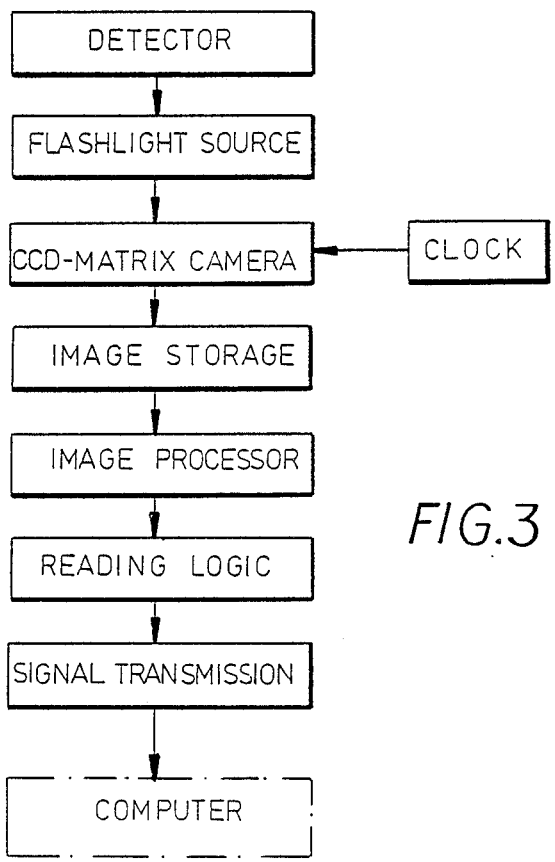
FIG.3

APPARATUS FOR EVALUATING INDICIA ON A MOVING CARRIER

FIELD OF THE INVENTION

Our present invention relates to an apparatus for recognizing or evaluating indicia or identification elements on moving carriers, e.g. a paper web in the course of manufacture. The term "indicia" is here used to refer to any record on the carrier which is applied in a predetermined pattern to identify a characteristic of the carrier.

BACKGROUND OF THE INVENTION

From the German Patent DE-PS No. 33 42 038 an indicia-evaluating apparatus is known which includes a reader provided with a reading head and an evaluating or analyzing logic.

Passing past the reading head is a carrier in form of a web and containing at least one identification field with markings defining the identification. These markings or indicia are holes punched into the web and are recognized by the reading head by detection of the light transmitted through the holes.

This system is disadvantageous because irregularities, defects, disturbances and the like along the surface of the web or damages of the web itself, like holes or ruptures, are recognized as markings and thus result in incorrect readings.

To avoid these problems, the reader is operatively connected to a detector for an activating mark which precedes the identification field on the web and activates via the detector an evaluating or analyzing logic only immediately before the passage of the identification field past the reading head.

Interfering signals present outside the identification fields are thus prevented from being recognized by the evaluating or analyzing logic which receives a signal sequence only during movement of the identification field past the reading head.

The activating mark is physically different from the carrier web and the respective markings so that they are not confused as identification marks even when the web is damaged or defective. Nevertheless, interfering signals were encountered, as defects or other disturbances on the web were picked up while passing with the identification field past the reading head.

OBJECTS OF THE INVENTION

It is thus the principal object of our present invention to provide an improved apparatus for recognizing identification elements on a moving carrier web obviating the afore-stated drawbacks.

Another object of the invention is to provide a device for reading indicia on a moving web, e.g. of paper, which provides a higher ratio of useful signal to background signal (high signal—to—noise ratio) to thereby improve the reading and practically eliminate errors in reading the indicia or determining when the indicia should be read.

SUMMARY OF THE INVENTION

We realize this object in accordance with the present invention by providing the carrier with identification marks made of a phosphorescent substance and exposing the marks to light (of a frequency and intensity to activate the substance) to generate phosphorescent light by the marks after the exposure to the activation source has been terminated; the phosphorescent light is recognized by a reader including a reading head and an evaluating or analyzing logic.

The invention is based on our discovery that phosphorescent substances upon being exposed to light of an appropriate wavelength are excited to persistent luminescence (after-luminescence) even when the exciting source is removed and that this allows phosphorescent marks to be used as indicia in a highly effective way.

This afterglow is the crucial difference between phosphorescent substances and fluorescent substances which by exposure to light are excitable and emit light while illuminated, but do not generate any afterglow.

The advantage of using phosphorescent substances for the identification marks is, however, not only to be seen in the possibility to be recognized and read after exposure to light has terminated because of persistent afterglow, but resides also in the fact that these substances belong to a family of substances which are not found in the carrier web so that no confusing signals can be generated. Fluorescent substances, on the other hand, are widely found in carrier webs, e.g. as brightening agents etc., thus leading to interfering signals in case fluorescence from such substances occurs during reading of the identification.

Moreover, in contrast to fluorescent substances which are of organic nature and show poor temperature-resistance, phosphorescent substances are usually inorganic structures (zinc sulfide or sulfides of rare earths) of considerable temperature resistance so as to withstand temperatures far exceeding 200° to 250° C. and thus are resistant to all kinds of heat treatment during the production of carrier webs.

Thence, the use of phosphorescent substances for the identification marks allows a lasting identification which is independent of all production processes and can easily be recognized without any errors as the reading occurs after the source of light is removed so that no secondary illumination or background is obtained, and the reading is accurate independent on the alterations, disturbances or defects on the surface of the carrier web.

According to the teachings of the invention, the reader includes a reading device which is provided with sensitive optoelectric sensors which recognize the optical image of the identification field either in its entirety or by scanning lines extending transversely to the running direction of the web. Cooperating with the sensor is a scanning unit which scans the image electrically stored in the sensors and yields respective signals transmitted to the evaluating or analyzing logic. Preferably, the reading head is a video camera, and in particular a CCD-camera (Charge-Coupled Device Camera) to which are connected an image storage unit and an image processor.

For reading the optical image of the identification field in its entirety, the use of a CCD-matrix camera is preferred while for reading the marks in lines or rows, a CCD-line scanning camera is preferred which is controlled by a clock member to allows reading each identification mark in several lines. The clock member is provided with a counter wheel which is operatively connected to a revolution counter generating electric timing signals for controlling the line scanning camera. Preferably, the counter wheel is driven by a guide pulley over which the carrier web is trained.

BRIEF DESCRIPTION OF THE DRAWING

The above and other objects, features and advantages of our present invention will become more readily apparent from the following description, reference being made to the accompanying highly diagrammatic drawing in which:

FIG. 1 is a top view of a section of a carrier web with an identification field of identifying marks;

FIG. 2 is a schematic sectional side view of a first embodiment of an apparatus according to the invention;

FIG. 3 is a block diagram of the apparatus according to FIG. 2;

SPECIFIC DESCRIPTION

Figure 4:
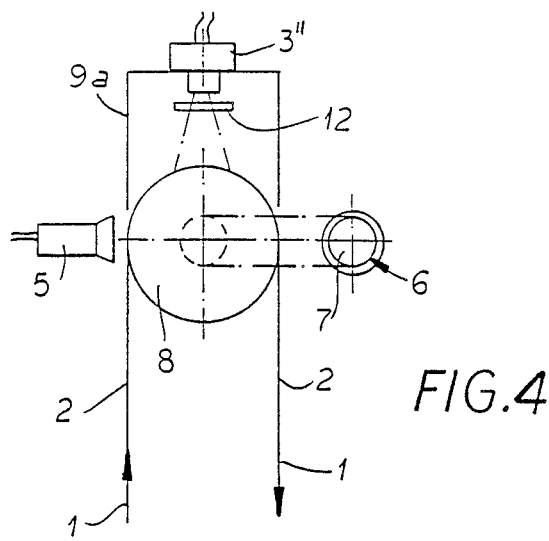
FIG. 4 is a schematic sectional side view of a second embodiment of an apparatus according to the invention.

FIG. 1, shows an identification field 4a of a carrier web 2 including a plurality of identification marks or indicia 4 arranged in form of a grid and defining in its entirety the identification.

Although being illustrated as squares, it is certainly within the scope of the invention to provide the marks 4 in any suitable shape, e.g. as circles, rectangles etc.

In addition, the identification marks 4 may also be bars of varying thickness spaced at equal or different distance from each other so as to define a pattern of bars which extend transversely to the traveling direction of the carrier web 2.

The identification marks 4 are made of a phosphorescent substance available in the trade as phosphorescent luminous color pigments or luminous paints of primarily yellow-green color and generally based on crystalline inorganic zinc compounds (zinc sulfide) which easily retain their characteristics at a temperature range between $-60°$ and $+1000°$ without any negative effects.

The temperature-dependent luminescence or afterglow period decreases only slowly with increasing temperature. The phosphorescent substances have a maximum emission of 500 to 550 nm wavelength in the spectral region and are excited in an optimum manner with a light source in the spectral region of 350 to 450 nm.

Turning now to FIG. 2 which shows a first embodiment of an apparatus for detecting and reading the marks 4 on the carrier web 2 and including a reading head 3' which is part of an otherwise not shown reader. The reader is additionally provided with an evaluating or analyzing logic which, however, is also not shown in FIG. 2. The reading head 3' projects into the interior of a truncated cone shaped casing 9 which serves as a dark chamber to shield from secondary light the reading head 3' and the web carrier 2 section which passes through the casing 9 at a spacing from the head 3' in the direction of arrow 1.

Accommodated within the casing 9 is a light source 5 which includes a pair of spaced flashlamps or strobes for temporarily illuminating and exciting the identification marks 4 at the exciting wavelength.

The reading head 3' is designed to read the marks only in their excited phosphorescent state i.e. when the marks 4 are no longer exposed to light emitted from the light source 5 but still afterglow.

In general, the reading head 3' is provided with optoelectric sensors which are sensitive to phosphorescent light of the excited identification marks 4 and detect the optical image of the field in its entirety. Additionally, the reading head 3' is provided with a unit for scanning the image as electrically stored in the sensors. The electric storage and scanning is dependent on the structure of the sensors and may be obtained in various manners as known in the prior art. Thus, a detailed description thereof appears redundant.

In any case, the reading head 3' is a video camera, and in particular a charge-coupled device or CCD-camera with image storage and image processor units connected thereto. Such CCD-cameras have a higher level control capability than other video or light-pattern sensors, a fact which is advantageous with regard to the light source 5 exciting the identification marks 4 to phosphoresce and with respect to exclusion of any disturbing impacts on the light source 5 when reading the marks 4. in the embodiment of FIG. 2, the CCD-camera is preferably a CCD-matrix camera for reading the identification field 4a of the carrier web 2.

As is shown in FIG. 1, the carrier web 2 is provided with two activating marks 10 which are spaced from each other in moving direction of the web 2 at opposing ends of the identification field 4a so that a close spatial relationship is obtained between the activating marks 10 and the identification field 4a of the carrier web 2. Thus, the activating marks 10 signal the beginning and end of the identification field 4a regardless in what direction the web 2 is advanced i.e. the web 2 can be moved in direction of arrow 1 or also in opposite direction.

As activating marks 10, wires or other signal filaments can be used which are physically different in their constitution and structure in comparison to the web 2 and the identification marks 4 and cooperate with a detector 11 which is responsive only to the activating marks 10 and is provided to actuate the light source 5 exactly at the moment when the identification field 4a passes past the light source 5. For determining the identification, the matrix camera 3' opens when the flash of lamp as generated by the light source 5 has ceased so that no light interferes with the phosphorescent marks 4.

Arranged in front of the optical aperture of the reading head 3' is a light filter 12 which is penetrable preferentially by the color of the phosphorescent light of the excited identification marks 4 so that the shorter-wave light of the light source 5 exciting the identification marks 4 to phosphoresce is weakened in comparison to the phosphorescent light of the identification marks 4. The light filter 12 also reduces or excludes interfering secondary lights and thus improves the signal/noise ratio.

FIG. 3 is a block diagram illustrating the various stages for recognizing the identification marks 4 on the carrier web 2. When recognizing the leading activating mark 10 of the respective identification field 4a, the detector 11 activates the flashlamps 5. After the flashlamp period has ended, the CCD-matrix camera 3' opens and provides reading pulses in correspondence to the pattern of the now phosphorescent marks 4. The reading pulses are transmitted via an image storage and image processor to a reading logic which reads the identification and provides a corresponding signal score which is supplied via a transmission member to a not shown process computer.

FIG. 4 represents a further embodiment of an apparatus according to the invention for recognizing the identification marks 4 on the carrier web 2 as shown in FIG. 1. The recognizing apparatus includes a reading head 3'' which is also a CCD-camera as explained with reference to the first embodiment.

Instead of the CCD-matrix camera 3' which recognizes the identification field 4a in its entirety, the reading head 3" of the second embodiment is, however, a CCD-line scanning camera reading the optical image of the field in lines which extend transversely to the moving direction of the web 2 as indicated by arrow 1. The reading head 3", which also includes optoelectric sensors and a scanning unit as described in connection with the reading head 3', is arranged behind the light source 5 when viewed in running direction of the web 2 and is responsive to a clock member 6 which controls the distance of the spaced lines read by the camera 3" on the web 2. The clock member 6 is provided with a counter wheel 7 which is driven without slip by a guide roller 8 over which the web is trained. The counter wheel 7 actuates a not shown revolution counter to provide electric timing pulses for controlling the line scanning camera 3".

Thus, the counter wheel 7 serves as an incremental pulse generator for the scanning distance between the lines in running direction of the web 2 whereby the line distance remains constant regardless of the running speed of the web 2. The line scanning is thus controlled in dependence on the running speed of the carrier web 2 so that the scanned lines on the web 2 have a distance from each other which is smaller than the dimension of an individual identification mark 4 in running direction of the web 2. Each identification mark 4 can then be read in several lines.

For shielding the line scanning camera 3" and the carrier web 2 from any light once the respective identification field 4a of the web 2 are exposed to the light from the light source 5, a casing 9a is provided which serves as a dark room in which the phosphorescent identification marks 4 are clearly visible and recognizable by the line scanning camera 3". As the casing 9a shields off the light source 5, the latter can be a continuously lighting halogen lamp. To avoid secondary light and other disturbing influences, a light filter 12 is arranged in front of the optical aperture of the reading head 3" which, as already described in connection with the apparatus according to FIG. 3, is primarily penetrable by the color of the phosphorescent light of the excited identification marks.

Figure 5:
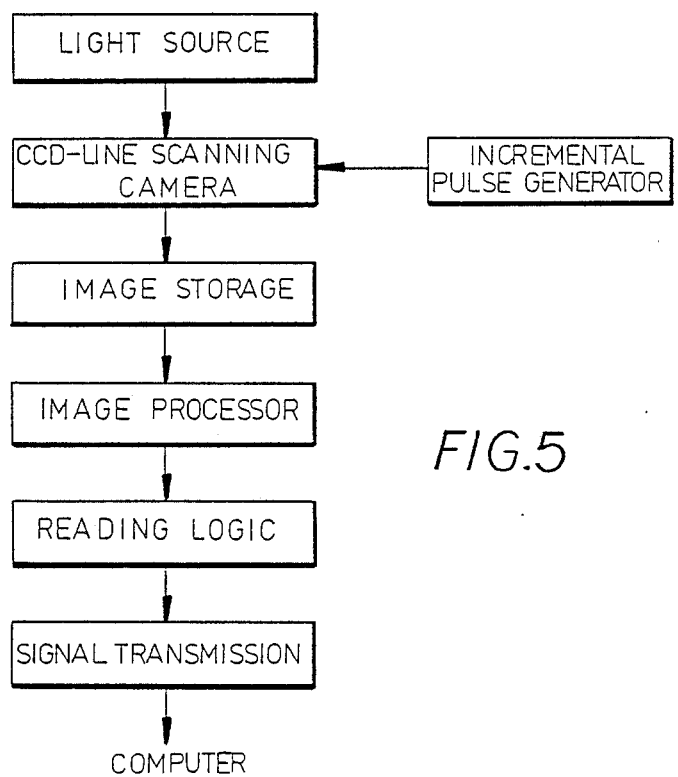
FIG. 5 is a block diagram of the apparatus of FIG. 4.

Referring now to FIG. 5 which illustrates a block diagram for recognizing the identification marks 4. Accordingly, the incremental pulse generator or counter wheel 7 controls the CCD-line scanning camera 3" which recognizes the phosphorescent light of the marks 4 after the latter are exposed to the light source 5 and passing through the casing 9a. The line scanning camera 3" provides corresponding output signals which are transmitted via the image storage and image processor to the reading logic in which the identification is determined and supplied via the signal transmission into the process computer.

We claim:

1. An apparatus for detecting a characteristic of a moving carrier, comprising:
   a pattern of marks defined by at least one phosphorescent substance in at least one identification field of said carrier;
   a reader including a reading head and an evaluating or analyzing logic, said head being juxtaposed with said carrier and said carrier running past said reading head, said reading head being a line scanning CCD camera with image storage and image processor units connected thereto;
   a light source at least temporarily exposing said identification marks to light and execute said marks to cause the marks to phosphoresce, said line-scanning CCD camera being arranged in a travel direction of said carrier behind said light source said reading head reading said identification in the phosphorescing state of said marks after the latter have been exposed to light from said source,
   a clock for controlling the distance between lines scanned by said line scanning camera and provided with a counter wheel driven by said carrier and including a revolution counter providing electric timing signals for controlling said line scanning camera; and
   a guide roller for guiding said carrier and driving said counter wheel.

2. The apparatus defined in claim 1, further comprising a casing accommodating said line scanning camera and said carrier for providing a shield against light emitting from said light source and other secondary light after said identification marks are exposed to light from said light source.

3. The apparatus defined in claim 1 wherein said light source is a continuously lighting halogen lamp.

4. The apparatus defined in claim 1 wherein said light source is at least one flashlamp.

5. The apparatus defined in claim 1 wherein said reading head has an optical aperture, and further comprising a light filter arranged in front of said optical aperture and essentially penetrable only by the color of the phosphorescent light of said excited identification marks.

6. An apparatus for detecting a characteristic of a moving carrier, comprising:
   a pattern of marks defined by at least one phosphorescent substance in at least one identification field of said carrier;
   a reader including a reading head and an evaluating or analyzing logic, said head being juxtaposed with said carrier and said carrier running past said reading head; and
   a light source at least temporarily exposing said identification marks to light and execute said marks to cause the marks to phosphoresce, said reading head reading said identification in the phosphorescing state of said marks after the latter have been exposed to light from said source, said carrier being provided with at least one activating mark for each identification field, said activating mark being of a constitution physically different in comparison to said carrier and said identification marks, said light source being at least one flashlamp, and comprising a detector responsive to said activating mark and actuating said flashlamp, said activating mark being arranged in such a manner that said flashlamp generates a light burst during passage of said identification field past said flashlamp.

7. The apparatus defined in claim 6 wherein said reading head is provided with optoelectric sensors sensitive for the phosphorescent light of said excited identification marks, and is further provided with a scanning unit for recognizing an optical image electrically stored in said sensors.

8. The apparatus defined in claim 7 wherein said sensors recognize said identification field in its entirety to determine the optical image thereof.

9. The apparatus defined in claim 7 wherein said sensors recognize said identification field in lines extending transversely to the running direction of said carrier in order to determine the optical image of said identification field.

10. The apparatus defined in claim 6 wherein said reading head is a video camera.

11. The apparatus defined in claim 6 wherein said reading head includes a matrix camera, further comprising a casing for accommodating said matrix camera and said carrier to shield the latter against secondary light.

12. The apparatus defined in claim 6 wherein said activating mark precedes said identification field in a travel direction of said carrier.

13. The apparatus defined in claim 6 wherein said reading head has an optical aperture, and further comprising a light filter arranged in front of said optical aperture and essentially penetrable only by the color of the phosphorescent light of said excited identification marks.

* * * * *